June 10, 1941.  A. BÜCHI  2,245,326
HORIZONTAL INTERNAL COMBUSTION ENGINE ASSOCIATED WITH
EXHAUST GAS TURBOBLOWER MEANS
Filed Jan. 25, 1940

Inventor:
Alfred Büchi
By
Sommers & Young
Attys.

Patented June 10, 1941

2,245,326

UNITED STATES PATENT OFFICE 2,245,326

HORIZONTAL INTERNAL COMBUSTION ENGINE ASSOCIATED WITH EXHAUST GAS TURBOBLOWER MEANS

Alfred Büchi, Winterthur, Switzerland

Application January 25, 1940, Serial No. 315,625
In Great Britain February 6, 1939

4 Claims. (Cl. 60—13)

This invention relates to horizontal internal combustion engines associated with exhaust gas turbo-blower means.

In connection with vertical internal combustion engines it is known to use an exhaust-gas-driven turbine which is sunk in the engine foundation underneath the engine cylinders and is coupled not only to a compressor for charging the engine, but also to a compressor supplying air to a further compressor disposed above the engine foundation and driven by the engine for supplying compressed air for external use. The air supply pipe leading from the turbo-compressor unit sunk in the foundation to the compressor above the foundation extends over the engine room floor at a low level.

The present invention is particularly concerned with the construction of an internal combustion engine arrangement having horizontal cylinders and operating by means of charging air supplied by an exhaust gas driven turbine.

According to the invention, one or more exhaust gas turbo-blower units receiving all or part of the exhaust gases discharging from the cylinders of the internal combustion engine are located below the floor level of the engine room, the exhaust gases being led downwardly away from the engine cylinders and into the turbine through exhaust manifolds arranged below the floor level of the engine room, while the charging air delivered by the charging blower is supplied into conduction means communicating with individual cylinders above the floor level of the engine room.

In internal combustion engine arrangements having two or a multiple of two juxtaposed groups of cylinders, on each cylinder block side of the engine a separate exhaust gas turbo-blower unit may be provided below the floor level of the engine room.

Figure 1:
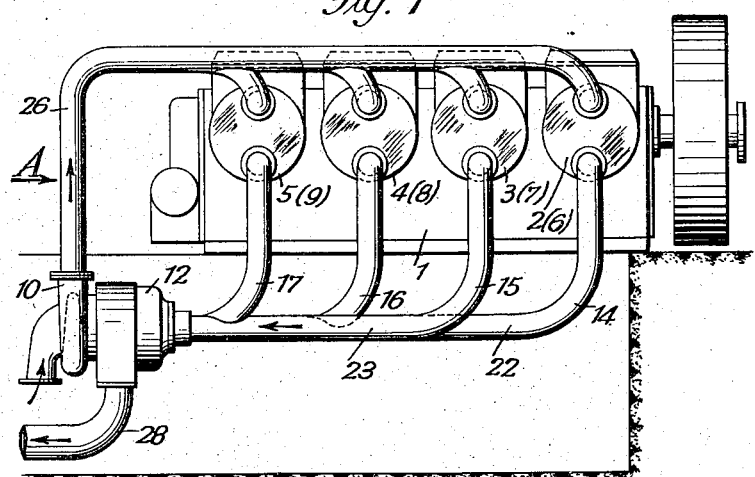
Figure 2:
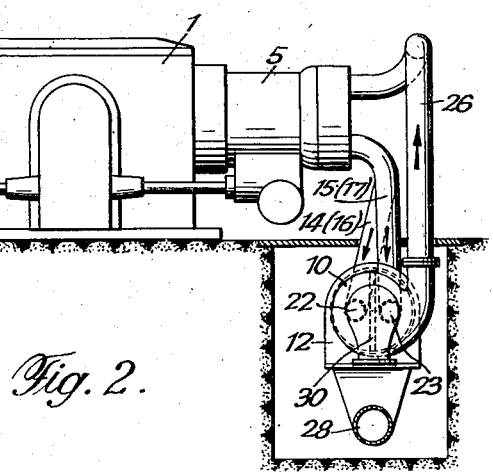

An embodiment of the invention is illustrated in the accompanying drawing by way of example only, in which Fig. 1 shows a schematic side elevation of an internal combustion engine having two juxtaposed rows of cylinders 2, 3, 4, 5 and 6, 7, 8, 9 respectively, and Fig. 2 is an end view of this engine when seen in the direction of the axis of the crank shaft thereof, as indicated by the arrow A in Fig. 1.

The numerals 10, 11, 12 and 13 refer to two exhaust gas turbo-blower units each of which is associated with the cylinders on one side of the engine. The charging blowers 10 and 11 of these turbo-blower units are driven by turbines 12, 13 respectively. The blower 11 is not shown in Fig. 2 for the purposes of illustration. The exhaust gases discharging from the engine cylinders are passed into the turbines 12 and 13 of these units through depending conduits 14, 15, 16, 17 and 18, 19, 20, 21 respectively connected with exhaust manifolds 22, 23 and 24, 25 respectively arranged below the floor level of the engine room. In this arrangement the exhaust conduits are so interconnected that the cylinders 2 and 4 exhaust into the exhaust gas driven turbine 12 through the common exhaust manifold 22 via the conduits 14, 16, while the cylinders 3 and 5 deliver the gases carried thereby through the manifold 23 via the conduits 15, 17. The construction may be such that the manifolds 22, 23 each lead to a separate admission nozzle chamber of the associated turbine so that the separation of the exhaust gases initially provided by the manifolds 22, 23 is perfectly maintained up to the turbine rotor wheel.

For the turbine 13 the exhaust gas conduits leading out from the various cylinders of the internal combustion engine are connected in a manner similar to that described for turbine 12 in that the cylinders 6 and 8 aligning with the cylinders 2 and 4 (as indicated in parentheses in Fig. 1) communicate with turbine 13 through the common manifold 24 (Fig. 2) and the cylinders 7 and 9 through the manifold 25. The partition walls provided in the turbines for forming two separate admission nozzle chambers in each turbine are indicated by dotted lines as at 30 and 31. The charging air delivered by the blowers is conducted toward the entrance ports of the various cylinders of the internal combustion engine 1 through conduits 26, 27 respectively extending above the floor of the engine room. The exhaust gases leave the turbines 12, 13 through discharge conduits 28, 29 respectively. With a view to providing access to the exhaust gas turbo-blower unit for inspection purposes covers 32 are arranged in the engine room floor above these units.

The exhaust gas turbo-blower units used may be of any suitable type comprising horizontal or vertical driving shafts. The horizontal type shown in the drawing providing for the exhaust manifolds to lead into the turbine in the axial direction is advantageous in regard to the flow of the gases.

The invention results in an arrangement of engines of the kind concerned in which the exhaust gas conduits and the charging air conduits are separated from each other and are exposed to view (the former by opening the respective cover 32) throughout their extent. In this arrangement the hot exhaust gas conduits as well as the exhaust gas turbines are located below the floor level of the engine room and thus beyond the operating range of the attendants. With such an arrangement, also the removal of the waste gases discharging from the turbines can be removed in unnoticeable manner through channels sunk in the floor and thus without obstructing any space of the engine room proper. The invention further provides for drawing in scavenging air at convenient cool places near the blower adjacent to the engine foundation so that the temperature of this air is relatively low. Moreover, this arrangement provides an effective sound-deadening for the exhaust gas turbo-blower unit.

Various changes and modifications may be made in the constructional details within the scope of the appended claims as specified therein.

What I claim is:

1. In a power plant, an internal combustion engine having horizontal cylinders, an exhaust gas driven turbo-blower for charging the engine, a floor supporting the engine with the horizontal cylinders extending above said floor, means connecting the engine exhaust to the turbo-blower unit so as to drive said unit by at least part of the exhaust gases discharging from said cylinders, said turbo-blower being located below the level of said floor so as to be covered by the latter, the means connecting the engine exhaust with said unit including a manifold extending below said floor level and covered by said floor, said manifold leading into the turbine part of said turbo-blower unit, branch exhaust gas conduction means leading from said engine cylinders downward into said manifold, and air conduction means communicating with the blower part of said unit and connecting with said cylinders above said floor in separated relation to said exhaust gas conduction means for supplying the charging air delivered by said unit to said cylinders.

2. In a power plant, an internal combustion engine having horizontal cylinders, an exhaust gas driven turbo-blower for charging the engine cylinders, a floor, said engine cylinders being divided into at least two juxtaposed groups, each group forming a block of cylinders extending above said floor, exhaust gas turbo-blower units adapted to be driven by exhaust gases discharging from said cylinders, one of said units being located on each cylinder block side of the engine below the level of said floor so as to be covered thereby, exhaust gas manifold means located underneath said floor leading into the turbine parts of said units, exhaust gas branch conduction means extending downwardly from the lower portions of said cylinders to join with the respective underground manifold means, air conduction manifold means extending across said cylinders adjacent to the upper portions thereof for communication with said cylinders in separated relation to said exhaust gas branch conduction means, and air conduit means communicating with the blower part of said units and with the respective air manifold conduction means in separated relation to said exhaust gas branch conduction means.

3. In a power plant, an internal combustion engine having substantially horizontally disposed cylinders, an exhaust gas driven turbo-blower for charging the engine, a substantially horizontal floor, the engine cylinders extending above said floor, an exhaust gas turbo-blower unit, having a turbine admission guide device, and adapted to be driven by at least part of the exhaust gases discharging from said cylinders, said turbo-blower being located below the level of said floor so as to be covered thereby, at least two separate exhaust gas manifolds arranged side by side beneath the floor level and extending in the horizontal direction and leading into said guide device of said unit, exhaust gas branch conduction means extending downwardly from the lower portions of the respective engine cylinders to join with the respective underground manifold, air conduction means extending across said cylinders adjacent to the upper portions thereof for communication with said cylinders in separated relation to said exhaust gas branch conduction means, and air conduit means communicating with the blower part of said unit and with said air conduction means in separated relation to said exhaust gas branch conduction means.

4. In an organization of internal combustion engine and exhaust gas driven turbo-blower for charging the engine, a floor, horizontally disposed engine cylinders extending above said floor; an exhaust gas turbo-blower unit, having a horizontal driving shaft, and a turbine admission guide device, driven by at least part of the exhaust gases discharging from said cylinders and located below the level of said floor so as to be covered thereby, said turbo-blower being located at the end of the engine opposite the driving end thereof and laterally of said opposite end, at least two separate exhaust gas manifolds extending horizontally below said floor level and leading into said guide device of said unit in the axial direction of the latter, branch exhaust gas conduction means extending vertically downward from the lower portions of the engine cylinders to join with the respective underground manifold; air conduction means extending across said cylinders adjacent to the upper portions thereof for communication with said cylinders in separated relation to said exhaust gas branch conduction means, and further air conduction means communicating with the blower part of said unit and with said first mentioned air conduction means in separated relation to said exhaust gas branch conduction means.

ALFRED BÜCHI.